United States Patent [19]
Teller et al.

[11] Patent Number: 4,961,533
[45] Date of Patent: Oct. 9, 1990

[54] INVENTORY CONTROL SYSTEM

[75] Inventors: David M. Teller; Richard Sheryll; Lance Ong, all of New York, N.Y.

[73] Assignee: Viac Inc., New York, N.Y.

[21] Appl. No.: 428,408

[22] Filed: Oct. 30, 1989

Related U.S. Application Data

[63] Continuation-in-part of Ser. No. 413,544, Sep. 27, 1989, abandoned.

[51] Int. Cl.$^5$ .................. G01G 19/40; G06F 15/24
[52] U.S. Cl. .................. 177/25.19; 364/403
[58] Field of Search .................. 177/25.19, 25.13; 364/403

[56] References Cited

U.S. PATENT DOCUMENTS

| | | |
|---|---|---|
| 2,279,375 | 4/1942 | Manning . |
| 2,936,163 | 5/1960 | Foster . |
| 3,073,400 | 1/1963 | Bauder et al. . |
| 3,137,356 | 6/1964 | Shields et al. . |
| 3,177,957 | 4/1965 | Adler et al. . |
| 3,257,033 | 6/1966 | Stott . |
| 3,291,232 | 12/1966 | Bell . |
| 3,442,453 | 5/1969 | Whitehouse, Jr. . |
| 3,447,720 | 6/1969 | Janigian et al. . |
| 3,459,271 | 8/1969 | Susor et al. . |
| 3,529,139 | 9/1970 | Godwin . |
| 3,575,248 | 4/1971 | Bell . |
| 3,608,655 | 9/1971 | Ray et al. . |
| 3,698,495 | 10/1972 | Vogt . |
| 3,737,631 | 6/1973 | Harris . |
| 3,863,724 | 2/1975 | Dalia, Jr. .................. 177/25.19 |
| 3,958,102 | 5/1976 | Burt . |
| 4,025,766 | 5/1977 | Ng et al. . |
| 4,176,260 | 11/1979 | Ward et al. . |
| 4,180,204 | 12/1979 | Koenig et al. . |
| 4,237,536 | 12/1980 | Enelow et al. . |
| 4,373,133 | 2/1983 | Clyne et al. . |
| 4,419,734 | 12/1983 | Wolfson et al. .................. 364/403 X |
| 4,563,739 | 1/1986 | Gerpheide et al. .................. 177/25.13 X |
| 4,843,546 | 6/1989 | Yoshida et al. .................. 364/403 |
| 4,866,255 | 9/1989 | Sing .................. 364/403 X |
| 4,917,198 | 4/1990 | Sing .................. 364/403 X |

Primary Examiner—George H. Miller, Jr.
Attorney, Agent, or Firm—Amster, Rothstein & Ebenstein

[57] ABSTRACT

Apparatus for automatically determining the weight of a plurality of articles, each of the articles having a surface portion with a unique element thereon, comprises a plurality of assemblies and a computer. Each assembly includes a surface for supporting an article, a transducer in operative contact with the supporting surface for producing an output signal indicative of the weight of an article placed on the supporting surface, and a sensor in operative relationship with an article on the supporting surface for producing an output signal indicative of the unique element on the surface portion of the article. A computer receives the transducer output signals and the sensor output signals and, for each article on the supporting surfaces, computes the weight of the article based on the transducer output signal and identifies the article based on the sensor output signal. The apparatus is especially useful as an inventory control system for a bar.

26 Claims, 5 Drawing Sheets

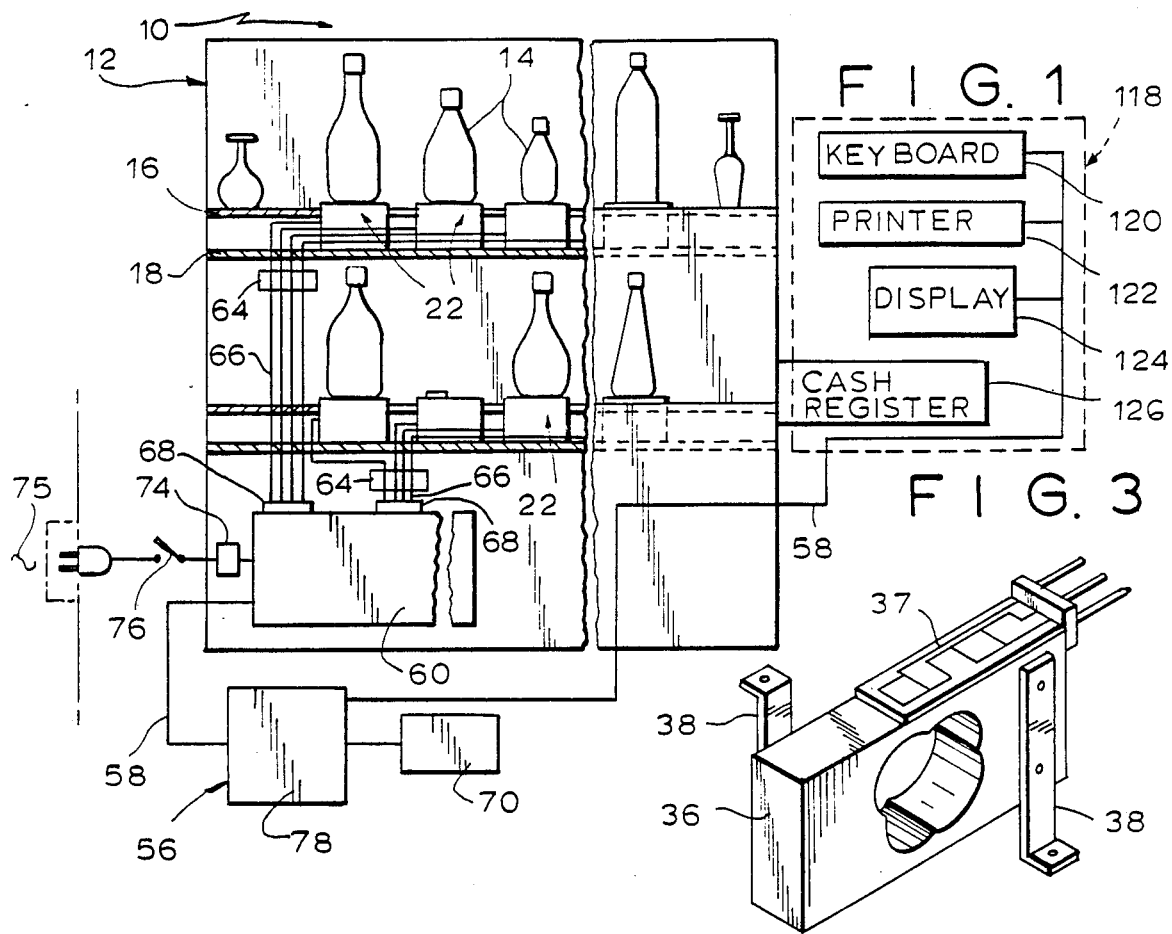
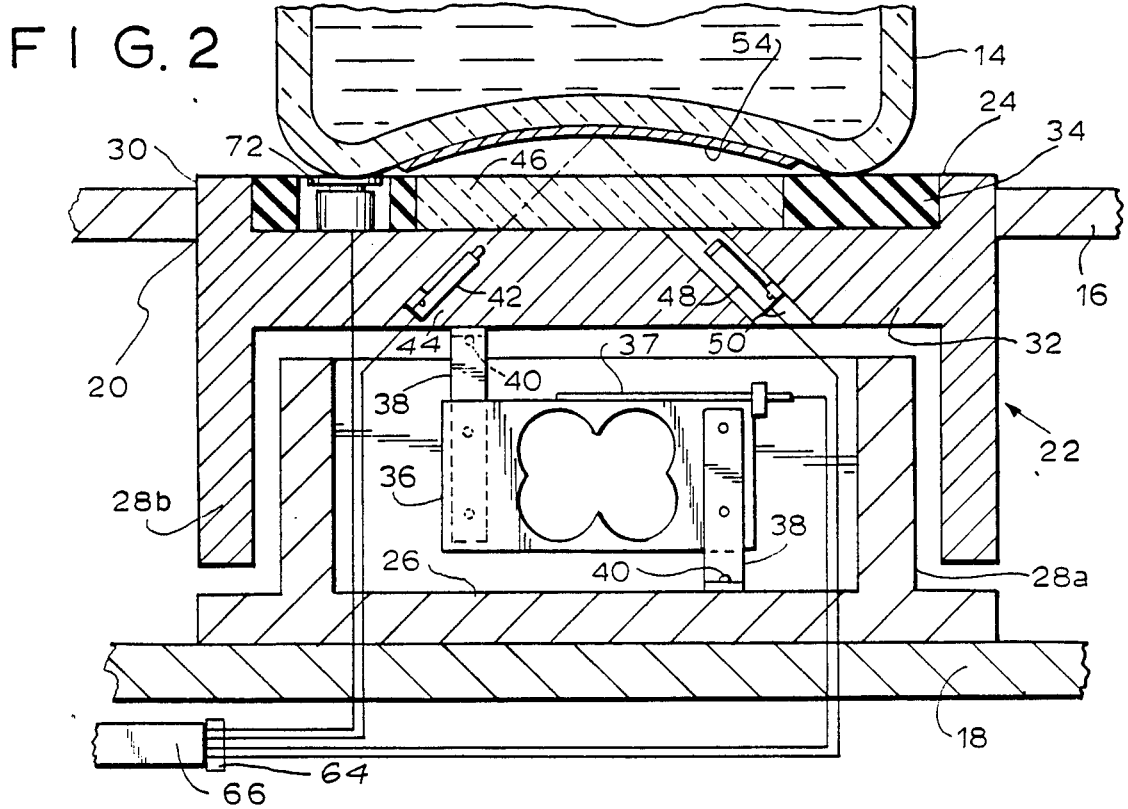

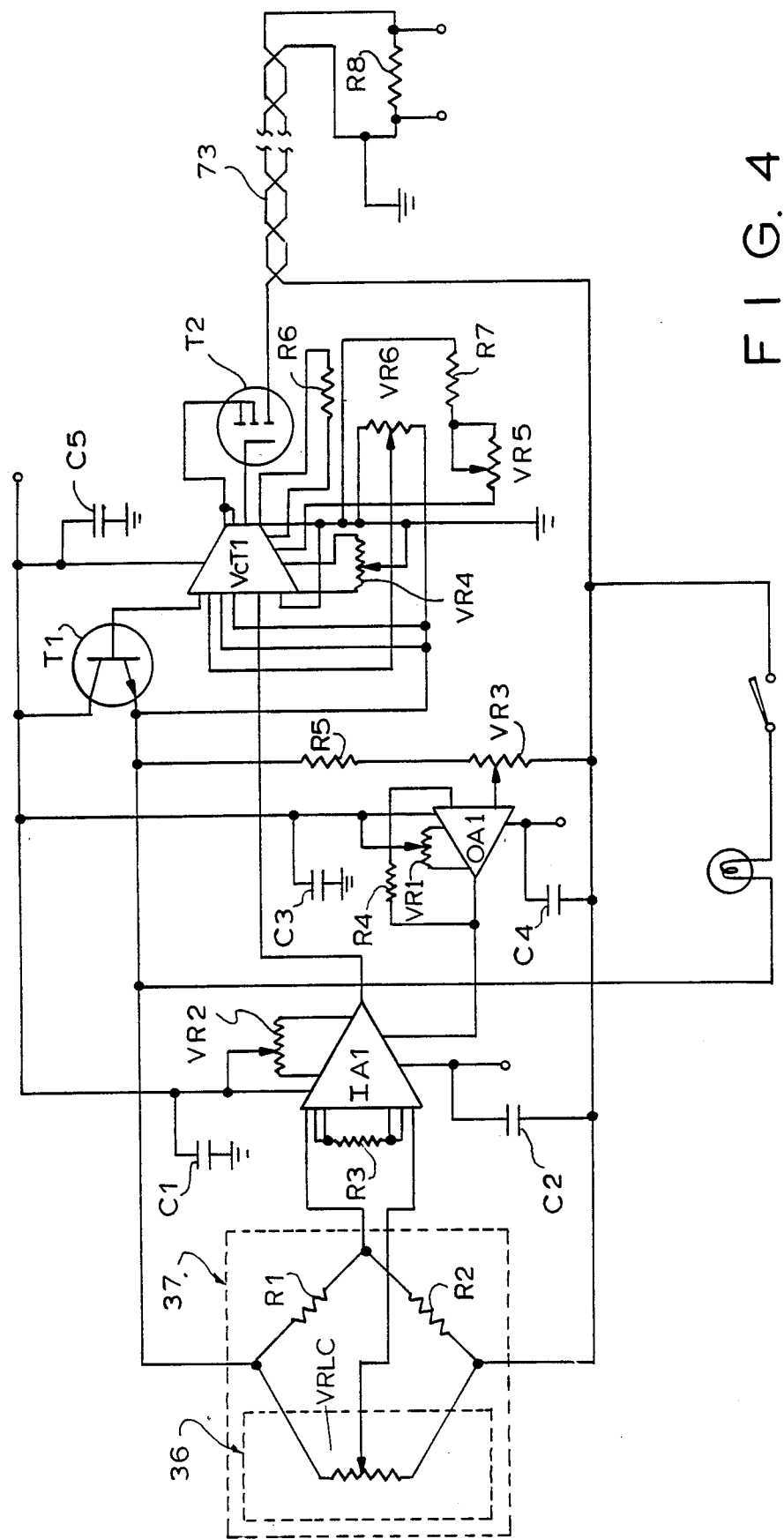
F I G. 4

4,961,533

INVENTORY CONTROL SYSTEM

This is a continuation-in-part of co-pending application Ser. No. 413,544, filed on Sept. 27, 1989.

BACKGROUND OF THE INVENTION

1. Field of the Invention

This invention pertains to inventory control systems, and particularly to inventory control systems of the type wherein the inventory consists of products dispensed from containers. Most particularly, the invention pertains to an inventory control system for alcoholic beverages dispensed from bottles intended for use in bars, restaurants, entertainment clubs and the like.

2. Prior Art

The sale of alcoholic beverages at bars in restaurants, taverns, entertainment establishments and the like yields hundreds of millions of dollars in annual revenue. Typically, the alcoholic beverages are in bottles displayed in at the back of the bar, with drinks being dispensed directly from the bottles, usually by the ounce, the price per ounce varying depending upon the type and brand of alcoholic beverage being dispensed. Payment for the drinks is usually received by the bartender directly from the customer, waiter or waitress in the form of cash.

A restaurant or tavern may employ one or more bartenders who collectively dispense hundreds of drinks containing alcoholic beverages and who collect cash receipts totalling hundreds of dollars. In a typical establishment, business is continuous, proceeding without interruption even during changes in bartenders. In such establishments, the opportunities for theft are many. If, for example, a bartender pours a drink and retains the cash payment therefor without recording the drink on the register, the theft is difficult to detect. Even if the proprietor eventually realizes that the cash receipts do not match the alcoholic beverages dispensed, such as would be apparent from a shortage in inventory vis-a-vis cash receipts, the proprietor may be unable to identify the offending bartender, as it is difficult, if not impossible, to determine the shift during which the theft occurred. Consequently, bartenders or other personnel responsible for these shortages often go undetected until the proprietor has been deprived of large sums of money and/or inventory. Cash receipts are also lost when a patron brings his own bottle into an establishment without protest from the bartender. It is estimated that these losses collectively amount to many millions of dollars each year.

Another problem for establishments dispensing alcoholic beverages is maintaining sufficient inventory. Typically, as noted above, the alcoholic beverages at the bar are in bottles displayed at the back of the bar Depending upon the popularity of the beverage, one or several bottles may be displayed. In addition, full bottles must be maintained at a separate inventory site in the establishment for replacing the bottles at the bar as they are depleted. Accordingly, it is important for the proprietor to maintain an accurate inventory for each different type and brand of alcoholic beverage to avoid an unintentional depletion of stock.

Some of the prior art approaches for reducing bar theft, and their drawbacks, are disclosed in U.S. Pat. No. 3,863,724 which itself is directed to such an apparatus. The apparatus disclosed in U.S. Pat. No. 3,863,724 includes a plurality of weight sensing mechanisms, one disposed beneath each of the several bottles of alcoholic beverages displayed at the bar. The output from each weight sensing mechanism is communicated to a computer, which senses the weight of the bottle on each respective mechanism at two different time intervals, e.g. at the beginning and at the end of a particular bartender's shift. The difference in weight at the beginning and at the end of the shift indicates the quantity of alcoholic beverage dispensed from the bottle placed on that mechanism, which can then be translated to expected cash receipts from that bottle for that shift.

A major drawback of the system disclosed in U.S. Pat. No. 3,863,724 is that it assumes that the same bottle will always be placed on the same weight sensing mechanism. Unfortunately, this is not a valid assumption. In a busy bar, several bottles may be temporarily removed form their weight sensing mechanism simultaneously as alcoholic beverages are dispensed. If these bottles are then placed back on different weight sensing mechanisms, the system described in the patent is rendered essentially useless. More to the point, a dishonest bartender could defeat the system by intentionally moving the bottles from one weight sensing mechanism to another.

An inventory control system for alcoholic beverages is disclosed in U.S. Pat. No. 4,563,739. This system includes a hand-carried portable unit having a weight sensing mechanism and a bar code reading wand for reading a bar code affixed to each bottle, each code being unique to the brand and bottle size to which it is affixed. Consequently, this system can both determine the weight of the bottle placed on the weight sensing mechanism and, by reading the bar code, identify the type of alcoholic beverage contained in the bottle. While this system may prove useful for inventory tracking, it is too labor intensive for use in monitoring expected cash receipts, as it requires each bottle behind the bar to be placed on the scale at the end of each shift—a time consuming process. Also, it is not seen how this system can distinguish between several bottles of the same brand and bottle size. Furthermore, use of the system described in this patent requires the bar code reading want to be scanned across the bar code on the bottle at a substantially uniform rate to insure that the bar code is properly read, thereby introducing a human error factor. Still further, such system is not automatic.

As will be apparent from the foregoing, the prior art does not teach an effective inventory control system for alcoholic beverages which is suitable for monitoring stock and expected cash receipt with minimum human intervention.

SUMMARY OF THE INVENTION

Broadly speaking, the apparatus of the present invention is useful for determining the volume contents of a plurality of containers, such as bottles containing alcoholic beverages, and comprises, in combination, (a) a plurality of assembles, each including (i) a surface for supporting a container, (ii) a transducer in operative contact with the surface for producing an output signal indicative of the weight of a container placed thereon, (iii) a sensor for receiving an output signal from a surface portion of the container, the surface portion of the container having an element thereon generating a unique output signal, the sensor producing an output signal indicative of the unique element; (b) means for scanning the output signals from the transducer and the sensor in each enclosure; and (c) means for receiving the transducer output signals and the sensor output signals and computing the volume contents of each bottle on a container supporting surface based on the transducer output signal, and for identifying the bottle based on the sensor output signal.

The system of the present invention is particularly suited for use in bars. In such use, the shelves at the back of the bar which display the bottles of alcoholic beverage are fitted with the assemblies of the present invention, there being sufficient assemblies to support each of the bottles on display. In the preferred embodiment, the unique elements disposed on the bottles comprise colored patches, with a differed colored patch on each bottle, such that each colored patch reflects a specific wavelength of light uniquely identifying the bottle on which it is placed. Preferably, a listing matching each unique color with the bottle on which it is placed is stored in the memory of a microcomputer incorporated as part of the system of the present invention, such information being updated each time a bottle is consumed or a new bottle is received in inventory.

When colored patches are used, the sensor in each assembly comprises a color sensor which detects the wavelength of light reflected from the colored patch of a bottle placed on the assembly. The output signal from each sensor is, in turn, applied to a microcomputer which, from its memory, determines the particular bottle placed on that assembly. At the same time, the weight sensing transducer in the assembly provides the computer with an output signal indicative of the weight of the liquid contents of that bottle. Accordingly, if the weight of the liquid contents of each bottle are determined at the beginning and end of each bartender s shift, the microcomputer may be programmed to generate a display or report indicating the volume of each type of alcoholic beverage dispensed during that shift, expected cash receipts, and an inventory of all bottles on the premises.

The unique elements on the bottles can also be electronic or magnetic tags which are capable of generating a signal or resonating at a frequency which is unique to each bottle. The signal can be read automatically by a sensor associated with each assembly and correlated to each bottle in inventory by the computer.

As will be apparent from the foregoing, a significant advantage of the apparatus of the present invention is that the volume content of each bottle is correctly determined regardless of which assembly the bottle is placed on. This is because each container is uniquely identified by the element placed thereon which, as noted above, may be a colored patch. Consequently, regardless of which assembly a particular bottle is placed on, the color sensor in that assembly will produce an output signal indicative of the wavelength of light reflected by the patch on that bottle, which is then input to the microcomputer which, through its memory, determines the specific bottle to which that color patch has been applied.

In a modification of the apparatus of the present invention, a plurality of weight sensing pads are included. These weight sensing pads are distributed throughout the bar area, such as on the serving surface. The weight sensing pads, which may comprise force sensing resistors, are selected to provide an output signal whenever an object exceeding a predetermined weight is placed thereon. For example, the predetermined weight may be selected to avoid output signals when objects other than bottles, such as ashtrays or glasses, are placed on a weight sensing pad and to generate an output signal when an object having the weight of a bottle is placed anywhere on the bar area other than on an assembly. When an output signal is generated by a weight sensing pad, an alarm signal is created, which may be an audio and/or visual alarm, to alert the proprietor or other management personnel that a foreign bottle may be in the premises.

The present invention also encompasses apparatus for monitoring the sale of articles including inventory item components and detecting discrepancies between the articles identified as sold and the inventory item components actually depleted from inventory. The apparatus comprises storage means thereof, the inventory item component or components thereof, and the quantity of each inventory item component in the article. Entry means are provided for entering data representing each article sold, and print means are provided for printing statement including indicia identifying the article sold (as entered in the entry means) by its name and the price thereof (as associated in the storage means with the article sold). Display means display data representing inventory item components and the quantities thereof actually depleted from inventory, and the microprocessor includes decrementing means for decrementing from the data represented on the display means the inventory item components and quantities thereof associated in the storage means with the article represented by the article sold data entered on the entry means.

In a preferred embodiment, the articles are beverages, the entry means (e.g., a keyboard) includes means for entering data representing the names of the articles sold and the number thereof, and the display means (e.g., a cathode ray tube) additionally displays the locations from which and the times at which the inventory item components were taken. Means may also be provided for signaling when the data displayed on the display means remains over a predetermined period of time.

Further features and advantages of the system in accordance with the present invention will be more fully apparent from the following detailed description and annexed drawings of the presently preferred embodiment thereof.

BRIEF DESCRIPTION OF THE DRAWING

FIG. 1 is a diagrammatic front elevational representation of a bar incorporating the system of the present invention;

FIG. 2 is a fragmentary sectional view, to a greatly enlarged scale, of one assembly of the system of FIG. 1;

FIG. 3 is an isometric view of a typical load cell within an assembly;

FIG. 4 is a schematic representation of a circuit for the load cell;

DETAILED DESCRIPTION OF THE PREFERRED EMBODIMENTS

Figure 5:
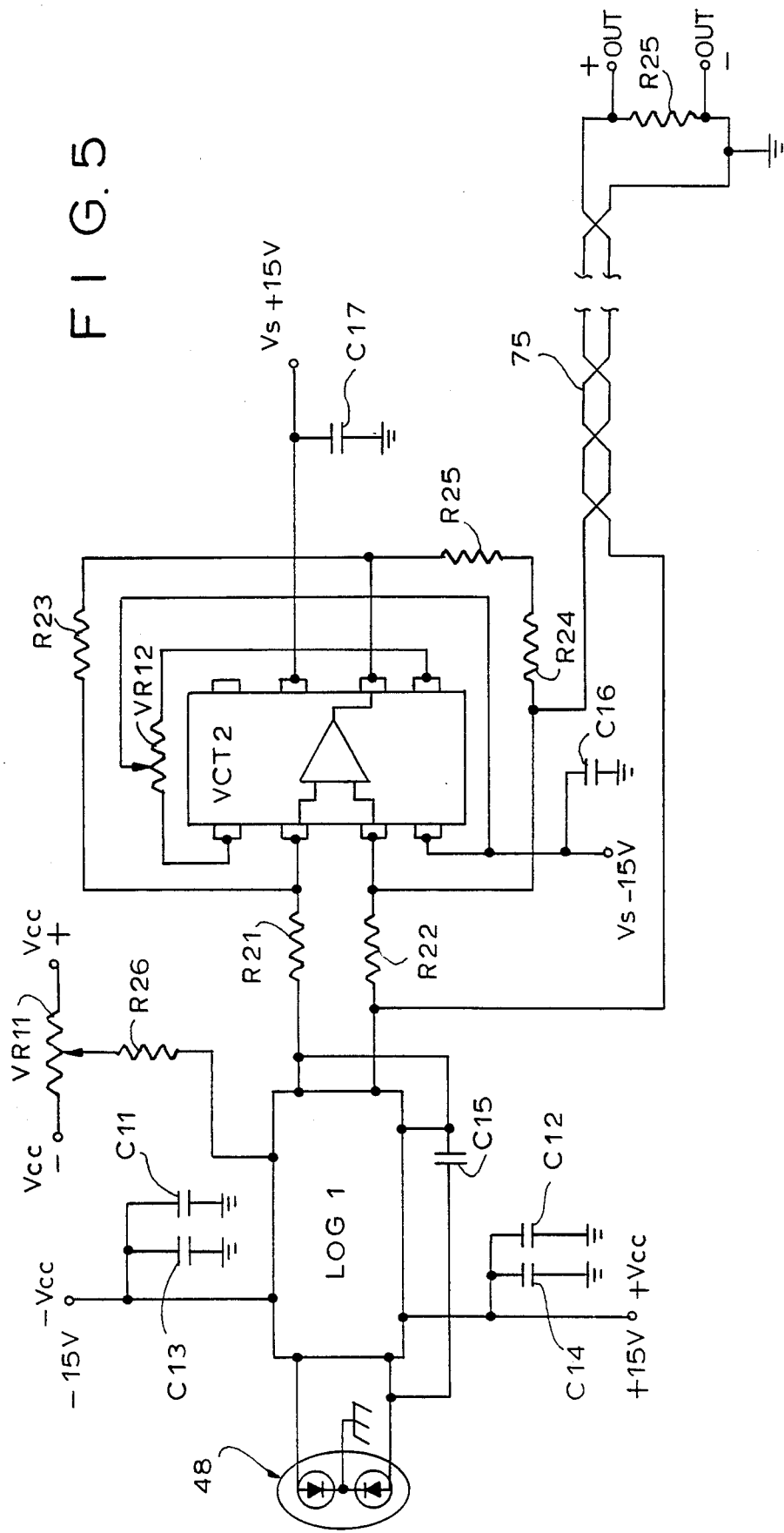
FIG. 5 is a schematic representation of a circuit for the color sensor.

Referring now to the drawings, and initially to FIG. 1 thereof, the inventory control system in accordance with the present invention, generally designated 10, is shown incorporated in a bar 12 of the type typically found in restaurants and the like. As shown, the bar 12 has a plurality of bottles 14 on display, most of which typically hold different types of alcoholic beverages. The bar 12 in FIG. 1 is shown with two tiers, though it should be appreciated that the system 10 may be utilized with bars having one or more than two tiers.

As shown, each tier of the bar 12 has a top 16 and a bottom 18, the top 16 having a plurality of openings 20, each of which receives an assembly generally designated 22. As shown, the upper surface 24 of each assembly 22 is dimensioned to support the bottom of a bottle 14. While it is preferred and shown that the upper surface 24 of each assembly is flush with the top 16 of its corresponding tier, this arrangement is not essential For example, in place of the arrangement shown in FIG. 1, the assemblies 22 could sit on top of the bar tiers, in which event the openings 20 may be dispensed with. However, recessing the assemblies 22 in the bar tiers is preferred, as this makes the system of the invention less conspicuous.

As shown, the system 10 also includes a microcomputer 56, which may be an IBM AT or equivalent having 512K of RAM and a 20 megabyte hard drive. Preferably, and as indicated by the interrupted line in FIG. 1, the microcomputer 56 is disposed at a location in the establishment remote from the bar 12. As also shown in FIG. 1, the microcomputer 56 is connected, as by a cable 58, to a circuit enclosure 60. As will be more fully explained below, the enclosure 60 contains multiplexing circuitry for communicating with the components in the assemblies 22. Preferably, the circuitry in enclosure 60 is disposed at the bar 12, such as the lowest tier thereof.

FIG. 2 shows a representative assembly 22 in greater detail. As shown, each assembly 22 is of rectangular or cylindrical configuration and has a bottom 26 with upstanding sidewalls 28a and a top 30 with depending sidewalls 28b, the sidewalls 28a, 28b being coaxially disposed for telescopic movement. Actually, the top 30 comprises two separate members, a lower, rigid mounting member 32 and a resilient or cushioned upper member 34 disposed thereon, the top surface of the upper member 34 comprising the upper surface 24 of the assembly 22.

Disposed inside each assembly 22 is a conventional load cell 36, which may comprise, for example, the model FT50 transducer available from Revere Corporation of America, Wallingford, CT. As shown, each load cell 36 is resiliently deflectable and rigidly secured in its respective assembly 22 by securement below to the bottom 26 and above to the mounting member 32 of the top 30. In a manner taught for the model FT50, such mounting may be achieved by a rigidly interconnected pair of L-shaped brackets 38 secured, as by screws 40, at one end to the load cell 36 and at the other end to a mounting surface of the assembly, i.e., either the assembly bottom 26 or top 30. In this manner the load cell 36 maintains the assembly top 30 spaced above assembly bottom 26. Movement of the movable assembly top 30 relative to the fixed assembly bottom 26 causes the load cell 36 to deflect slightly.

As best shown in FIG. 3, the load cell includes a strain gauge 37 applied to the resilient top surface of the load cell 36. As the weight of a bottle 14 on the upper surface 24 of the assembly 22 causes the top 30 to move relative to the assembly bottom 26, the top surface of the load cell 36 expands and the strain gauge 37 records a change in resistance. As described below with reference to FIGS. 4 through 7, the change in resistance is used to calculate the weight of the bottle 14 of the assembly 22.

Each assembly 22 also has a light source 42 secured therein. The light source may comprise, for example, an incandescent tungsten lamp, such as the Type OL344BPS available from Oshino Electrical Lamp Works, Ltd., Tokyo, Japan. As shown, the lamp 42 is aligned with an opening 44 in the upper mounting member 32 and with a clear section 46 in the member 34 above the opening 44. Consequently, when the light 42 is energized, light therefrom passes through the opening 44 and clear section 46, thereby illuminating the bottom of a bottle 14 disposed on the member 34.

Also supported inside each enclosure 22 is a color sensor 48, which may be a model PD150 color sensor available from Sharp Electronics Corporation, Microelectronic Division, Mahway, N.J. Like the light source 42, the color sensor 48 is aligned with an opening 50 in the mounting member 32 and a clear section 46 in the assembly top 30. As shown, both the light source 42 and the color sensor 48 are angled inwardly such that at least some of the light from the light source 42 impinging upon the bottom of a bottle 14 on the member 34 is reflected to the color sensor 48.

The assembly 22, that is, the bottom 26, sidewalls 28 and mounting member 32, may be formed of aluminum, stainless steel or such non metallic structural materials as plastic. The clear section 46 may comprise clear acrylic or other plastic. Preferably both the light source 42 and color sensor 48 are mounted on mounting member 32 of assembly top 30 for movement therewith.

As shown, wire connections from the load cell 36, light source 42 and color sensor 48 are secure to terminals of a connector 64 of the assembly 22. In this regard, the number of wires shown in FIGS. 1 and 2 is reduced for purposes of clarity, the actual number of wire connections are more accurately represented in the circuit diagrams of FIGS. 3 and 4. As shown, each connector 64 is joined by a cable 66 to a connector 68 on the circuit enclosure 60. The reason for this will be more fully explained below.

In accordance with the invention, each bottle 14 of alcoholic beverage in the establishment is uniquely identified by a color patch 54 affixed, as by an adhesive (not shown), to the bottom of the bottle 14. Preferably, Pantone color patches are employed. There are hundreds of different Pantone colors, each uniquely identifiable by the wavelength of the light reflected therefrom. Consequently, there are more than enough different Pantone colors to uniquely identify each bottle in an having a diameter of approximately two inches, and is provided with an adhesive on the reverse side protected by a peel away paper backing.

Each Pantone color is uniquely identified by a code, which may be a number, letter of alphanumeric sequence, and it is contemplated that the code for each color will be imprinted directly on each patch 54 of that color. In accordance with the invention, when bottles of alcoholic beverage first arrive at the establishment, a Pantone color patch 54 is applied to the bottom of each bottle. As each incoming bottle is so marked, the unique code for the color patch applied thereto is entered in the computer memory along with an identification of the particular bottle to which the color patch is affixed, e.g. Johnny Walker Black Label, one litre bottle. The identification for each different brand and bottle size is also preferably a unique number, letter or alphanumeric code, which may be kept on a separate sheet for ready access by the person or persons responsible for inventory control. So, for each incoming bottle 14, two codes will be entered in the microprocessor or microcomputer 56, one for the color patch 54 applied thereto and one identifying the brand and bottle size.

When the unique codes for an incoming bottle 14 and its attached color patch 54 are first input into the computer 56, the computer 56 is programmed to register the contents of that bottle as "full", as by ascribing to that bottle some predetermined volume content. For example, the memory of the computer may be preprogrammed with a "full" volume content for each different type of alcoholic beverage and bottle size served at the establishment, which information can then be "looked up" in the computer memory as the proprietor enters each incoming bottle. Alternatively, and recognizing that even for the same type and bottle size of alcoholic beverage the contents of a full bottle may not be the same, a separate load cell 36, similar to the one in each assembly 22, may be positioned adjacent to the computer 56 such that the actual volume content for each incoming bottle may be computed. As the methodology for computing the actual liquid volume contents for an incoming full bottle is the same as the methodology described below for computing the liquid volume contents of each bottle 14 on an assembly 22 in the bar 12, that methodology is not repeated here. Suffice it to say that if the proprietor follows the procedure above for each bottle 14 arriving at the establishment, the computer memory will, at all times, contain data indicating the number of bottles in the establishment and the type of alcoholic beverage in each, as well as the liquid volume contents of each. The computer can easily upon request group the data for similar types or brands together to determine the number of bottles and total liquid volume contents, say, for "Scotch" or "Black Label Scotch."

The permanent memory of the microcomputer 56 is provided with the specific information concerning each different type and bottle size of alcoholic beverage served at the establishment, namely, the weight of the bottle when empty and the specific gravity of the alcoholic beverage therein. This information need only be entered once for each type and bottle size of alcoholic beverage. Typically, this information will be input when the system 10 is first set up, though additional alcoholic beverages may be added to the memory of the microcomputer 56 after the system is operational. Similarly, the memory of the microcomputer 56 includes a listing of all the Pantone colors, their codes and the electrical response by the color sensor to the specific wavelength of light reflected by that color, which listing is also entered only once, usually when the system is first set up, though here too, new colors may be added after the system is operational.

It should now be apparent that when a bottle 14 is placed on the upper member 34 of the assembly 22 and the light source 42 energized, light from the source is reflected off the Pantone color patch 54 on the bottom of the bottle 14 to the color sensor 48. In a manner more fully described below, the wavelength of light detected by the color sensor 48 is provided in digital signal format to the microcomputer 56 which, by comparing that signal to its memory, identifies the color patch 54 and the specific bottle 14 to which that color patch 54 is applied. At the same time, the load cell 36 in the assembly 22 senses the weight of the bottle 14, and this information is likewise provided in digital signal format to the microcomputer 56.

In use, it is contemplated that the proprietor of the establishment or some other management level personnel will instruct the microcomputer 56 to inventory each active bottle 14 (an active bottle being defined as one that is either in use beginning of each shift though, as will be apparent from this description, the bottles 14 may be inventoried as often as desired Assuring an inventory is run at the beginning of a shift, the exact amount of alcoholic beverage in each bottle 14 at the beginning of the shift may be determined. This task is carried out by utilizing the multiplexing circuitry (described more fully below) within the circuit enclosure 60 to sequentially scan the output signals from the load cells 36 and color sensors 48 within each of the assemblies 22. During this scan, each bottle 14 at the bar 12 is uniquely identified by the color patch 54 thereon, which by comparison with the information previously input to the computer memory, determines the particular alcoholic beverage in that bottle. At the same time, the load cell 36 provides a signal indicative of the weight of that bottle 14 to the microcomputer 56, which is programmed to subtract therefrom the weight of the empty bottle, as stored in the computer's memory, leaving the weight of the liquid contents. The computer is further programmed to divide that weight by the specific gravity for the alcoholic beverage in question, thereby yielding the liquid volume in that specific bottle, and that information is then stored in the computer memory.

A major advantage of the system 10 of the present invention is that the microcomputer 56 will correctly determine the volume content of each bottle 14 regardless of which assembly 22 the bottle is placed on. Consequently, the fact that a bartender may remove a bottle from one assembly 22 and place it on another does not in any way inhibit the ability of the system 10 to correctly monitor the content of that bottle, as each bottle is always uniquely identified by the color patch 54 thereon.

Following the above example, the volume content of each bottle 14 is again determined at the end of each bartender's shift. From this information, the microcomputer can generate a display or report, as on a printer 70 linked to the microcomputer 56, indicating the volume of alcoholic beverage dispensed from each bottle 14 during the shift and, assuming as is preferred that the microcomputer 56 is further programmed with the price per unit volume for each different alcoholic beverage, the microcomputer can generate a further display or report of expected cash receipts based on the volume of alcoholic beverage dispensed from each bottle. The computer may be further programmed to provide a list of all bottles 14 in stock but not at the bar 12, which, coupled with the report for bottles at the bar 12, would give the proprietor a complete display or report of every bottle 14 in the establishment and its liquid volume contents.

Of course, as the bottles are used and new ones substituted, there will come a time when all of the Pantone colors will have been used, at which time it will be necessary to reuse colors. To avoid placing the same color patch 54 on two active bottles, the microcomputer 56 is programmed to display on request the unique code for each Pantone color not in use or, alternately, for each Pantone color in use. Either way, this avoids the possibility of the user inadvertently placing patches 54 having the same Pantone color on two active bottles 14. As a further precaution, the microcomputer may be programmed to generate an error signal or sound an alarm if the user attempts to enter information for a Pantone color that is already on an active bottle 14. Of course, once a bottle 14 is completely emptied, the user may delete that bottle from the microcomputer memory thereby making the Pantone color affixed thereto available for application to a new bottle Typically, bottles will be deleted from the computer memory immediately after an inventory report is run.

It is unlikely that a bartender will bring in a bottle 14 with a color patch thereon. But even if this did occur, the computer may be programmed to recognize the foreign bottle, as the color patch thereon would either duplicate an "active" color or indicate a color not in use on an active bottle. Either way, the computer 56 may be programmed to provide an audio and/or visual alarm.

Figure 6:
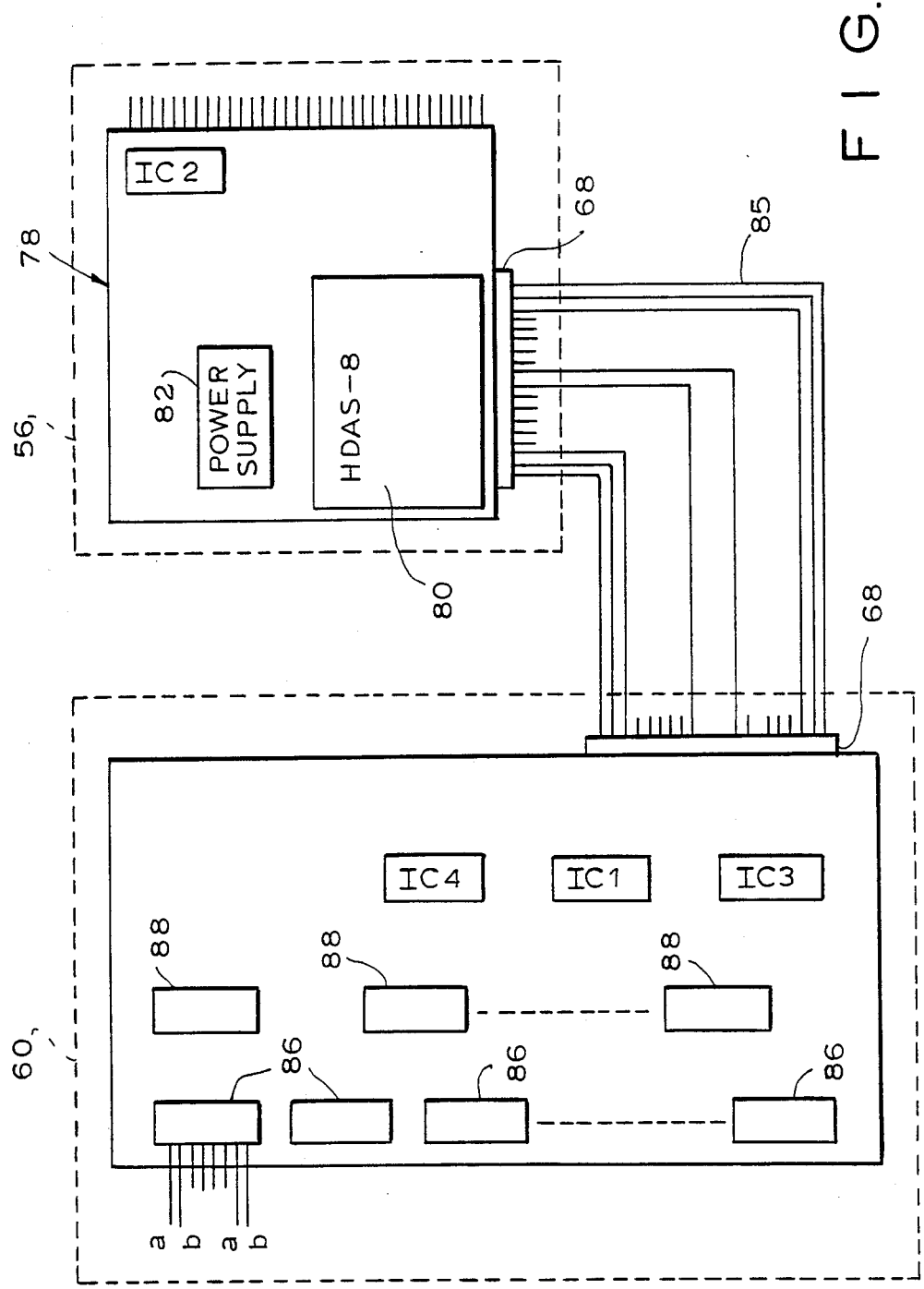
FIG. 6 is a schematic representation of the multiplexing circuit.

Referring now to FIGS. 4–6, suitable circuits for the load cell 36 and color sensor 48, and for transmitting signals therefrom to the microcomputer 56, are shown.

Initially referring to FIG. 4, the circuit for the load cell 36 in each assembly 22 is shown. As shown in FIG. 3, the load cell 36 functions as a variable resistor whose resistance varies linearly in response to the load placed thereon. The load cell resistance VRLC is incorporated as two arms of a bridge circuit 37 whose other two arms are defined by known resistors R1, R2. The differential output voltage from the bridge circuit 37, which varies linearly with changes in the resistance of the load cell 36, is input to an instrumentation amplifier IA1 for boosting the gain of the output signal from the bridge circuit 37. The instrumentation amplifier selected for this purpose has a high input impedance, low noise and low draft to insure accurate response to the differential input. The potentiometer VR2 is provided to adjust the input offset to the instrumentation amplifier. Also shown in FIG. 4 is an operational amplifier OAI for adjusting the tare of the output signal from the instrumentation amplifier IA1. This is accomplished by adjusting the potentiometer VR1 for zeroing the output from the instrumentation amplifier IA1 when no bottle is on the assembly 22, thereby removing any output signal from the inherent load on the load cell due to the top 30 of the assembly.

As shown, the amplified output signal from instrumentation amplifier IA1 is input to a precision voltage to current converter/transmitter VCT1 for converting the analog output voltage signal from IA1 to a current signal for avoiding interference due to noise during subsequent signal transmission. Biasing for the voltage to current converter/transmitter VCT1 is provided by resistors R6 and R7 and variable resistors VR4, VR5 and VR6. As shown, the voltage to current converter/transmitter VCT1 is operated with an external P Channel MOSFET T2 to reduce the heat generated in VCT1 to maintain its accuracy.

Secondarily, the voltage to current converter/transmitter VCT1 is used to provide a +10 volt reference source for the load cell bridge circuit. As shown, the voltage reference source from the VCT1 is input to an NPN transistor T1 for current amplification, with the emitter output voltage of the transistor T1 set at 10 volts.

The differential current output from VCT1 is fields which could affect the signal, to a resistor R8 functioning as a current to voltage converter. The differential voltage output across R8 is, in turn, applied to the multiplexing circuit of FIG. 6, which is described below.

Also shown in FIG. 4 is the light source 42, which is activated upon the closing of a contact switch 72. The contact switch 72 is closed whenever a load is placed on the upper surface 24 of an assembly 22, such that the light source 42 is not constantly activated, thereby extending its life. The contact switch 72 is shown in FIG. 2.

It will be apparent that a circuit similar to that shown in FIG. 4 is present in each assembly 22. For obvious reasons, it is not desirable to place a separate power supply in each assembly 22. Therefore, in the preferred system 10, the 15 volt DC supply voltage for the circuit of FIG. 3 is provided by a conventional AC to DC converter 74 (see FIG. 1), such that the power supply may be plugged into any outlet in the vicinity of the bar 12, with multiple connections running from that power supply to the various assemblies. As shown, the converter may also be used to power the circuit which is in the enclosure 60, in which event the power supply lines for the assemblies 22 run through the enclosure 60. Overloading is not a problem, as the current requirements for the circuits of FIGS. 4–6 are extremely low. As shown in FIG. 1, the feed from the power supply 74 to the bar 12 is preferably provided with a line switch 76, such that the system 10 may be shut down, as when the establishment is closed.

Typical values for the components used in the circuit of FIG. 4 are shown below:

| | |
|---|---|
| IA1 | INA 101 CM/CG Instrumentation Amplifier |
| OA1 | OPA 27 Ultra-Low Noise Precision Operations Amplifier |
| R1 | IK ohm |
| R2 | IK ohm |
| R3 | 40.04 ohm |
| R4 | IK ohm |
| R5 | 40K ohm |
| R6 | 31.6 ohm |
| R7 | 49.9K ohm |
| R8 | 250 ohm |
| C1 | 1.0 uf |
| C2 | 1.0 uf |
| C3 | 1.0 uf |
| C4 | 1.0 uf |
| C5 | 1.0 uf |
| VR1 | 10K ohm |
| VR2 | 100K ohm |
| VR3 | 100K ohm |
| VR4 | 100K ohm |
| VR5 | 100K ohm |
| VR6 | 20K ohm |
| VCT1 | XTR 110 AG Voltage To Current Converter/Transmitter |
| T1 | 2N 3055 NPN Transistor |
| T2 | VPO 808B P-Channel MOSFET Transistor |

Referring now to FIG. 5, a circuit for processing the output signal from the color sensor 48 is shown. The theory of operation of the preferred color sensor 48 and suitable signal processing circuitry therefor are described at pages 137–141 of the Optical Electronics Data Book, 1988–89, published by Sharp Electronics Corp., which is directed to Sharp's model PD150. Basically, the color sensor 48 comprises two photodiodes in a single chip whose silicon thickness functions as an optical filter. Shorter wavelengths are absorbed near the surface of the silicone while longer wavelengths are absorbed at a deeper level, such that the PN-junction of the photodiode closer to the surface is more sensitive to shorter wavelengths and the PN-junction of the deeper photodiode is more sensitive to longer wavelengths. Therefore, the short circuit current ratio between the two photodiodes may be used to determine the specific wavelength of incoming light. In other words, there is a unique short circuit current ratio for each different wavelength of light.

The circuit portion following the color sensor 48 in FIG. 5, which comprises the log ratio amplifier LOG1 and its associated biasing circuitry, logarithmically compresses the short circuit currents from the two photodiodes in the color sensor 48 and then subtracts one logarithmically compressed short circuit current from the other to yield an output voltage equal to LOG ($I_{SC2}/I_{SC1}$), where $I_{SC2}/I_{SC1}$ uniquely identifies the wavelength of the incoming light As shown, the differential output from the log ratio amplifier LOG1 is input to a voltage to current convertor/transmitter VCT2 which converts the analog output voltage signal from LOG1 to a current signal.

As shown, the differential output from VCT2 is transmitted, via twisted wire pairs 75 for reducing noise pick-up, to resistor R26, which converts the current signal from VCT2 to a voltage output. The voltage output across R26 is applied to the multiplexing circuit of FIG. 6.

Typical values for the components used in the circuit of FIG. 5 are shown below:

| | |
|---|---|
| Colon Sensor | PD 150 Sharp Electronics Corp. |
| VCT 2 | OPA 445 P Burr - Brown |
| LOG 1 | LOG 100 JP Precision Log Ratio Amplifier |
| R20 | 100K ohm |
| R21 | 100K ohm |
| R22 | 100K ohm |
| R23 | 10K ohm |
| R24 | 9.9K ohm |
| R25 | 100 ohm |
| R26 | 250 ohm |
| VR11 | 10K ohm |
| VR12 | 100K ohm |
| C11 | 10 uf |
| C12 | 10 uf |
| C13 | 1000 pf |
| C14 | 1000 pf |
| C15 | 10 pf |
| C16 | .1 uf |
| C17 | .1 uf |

FIG. 6 shows a multiplexing circuit for sequentially scanning the output signals from the load cell 36 and color sensor 48 of all the assemblies 22 and for inputting the same to the microcomputer 56. In FIG. 6, the broken line box designated 60 indicates those components of the system 10 incorporated within the circuit enclosure 60 which, as noted above, is preferably disposed at the bar 12. If there is a large distance between the circuit enclosure 60 and the microcomputer 56, it may be necessary to utilize conventional line drive circuitry in the circuit enclosure 60 to enhance the transmission of the digital signal. Preferably, the ±15 v DC volt power supply for the multiplexing circuitry within the enclosure 60 is provided by the converter 74 (see FIG. 1). The balance of the circuit components in FIG. 5 are mounted on an expansion board 78 in the microcomputer 56 which, as noted above, may be an IBM AT or equivalent. A suitable expansion board 78 is the Model PCL-750 Prototype Development Card manufactured by PC-Lab Cards augmented by an HDAS-12 bit microelectronic data acquisition system chip 80 manufactured by Datel, Inc., Mansfield, Mass., a power supply 82 for the HDAS-8 chip such as the BPS-15/100-D5, also manufactured by Datel, which provides ±15 v and +5 v outputs at 100 ma; and a HEX 3-state bus driver chip, used as a latch for coordinating communication between the HDAS-8 and the microcomputer 56, which may be the 74LS367 IC chip IC2 as manufactured by a number of companies.

The Model PCL-750 Prototype Development Card expansion board 78, as provided by the manufacturer, includes the usual circuits necessary for communication between the expansion board and the central processing unit of the microcomputer, such circuits including a memory address decoder, input/output address decoder, etc. As such circuits and their utilization are well known to persons of ordinary skill in the art, a as the manner of integrating the expansion board 78 with the HDAS-8 chip 80, the power supply 82 and the bus driver are known to persons of ordinary skill in the art, a further description thereof is unnecessary. Suffice it to say that these components, in combination, establish communication between the central processing unit of the microcomputer 56 and the multiplexing chips described below.

The circuit shown in FIG. 6 is capable of handling up to 512 assemblies 22, which is a relatively large bar. However, and as will be apparent to those of ordinary skill in the art once this description is known, even that capacity may be expanded.

Focusing first on the components within the circuit enclosure 60, a two tiered multiplexing system is employed. The first tier is shown at the left, and comprises 64 MX1616 multiplexing chips 86 of a type available from Datel, Inc., Mansfield, Mass., and described in detail in its September, 1988 Data Conversion Catalog at pages 5-7 through 5-14. Each chip is capable of handling sixteen separate inputs and, considering that there are two outputs from each assembly 22, one from the load cell 36 and one from the color sensor 48, each chip 86 handles eight assemblies. In FIG. 6, the "a" input channels designate an input from a load cell 36 and the "b" input channels designate an input from a color sensor 48. So, for example, in the first chip 86 of tier 1, the inputs a and b designate the inputs from the load cell 36 and color sensor 48 of a first assembly 22. For purposes of clarity, only four of the sixty-four MX1616 chips 86 in tier 1 are shown in FIG. 6.

Channel addressing of the tier 1 chips 86 is accomplished by a three bit binary code generated by a chip IC1 which may comprise a 74LS373 chip as manufactured by a number of companies, functioning as an octal transparent latch. The three bit channel address sent by IC1 is also input to the HDAS-8 chip 80 on the expansion board 78. As is well known in the art, inputting the three bit channel address from IC1 to the HDAS-8 chip 80 is necessary for the microcomputer 56 to identify which assembly is being scanned at any given point in time. Each multiplexing chip 86 in tier 1 also receives an inhibit signal for enabling/disabling the chip, from a chip IC3, which may comprise a 74 LS 138 chip, and which is required whenever multiple chips are used together. The three bit address for instructing IC2 to generate the inhibit signal is. provided by the IC1 and a chip IC3 which may comprise another 74LS373 chip. IC3 is necessary because six of the available output lines from IC1 are utilized for enabling the multiplexing chips. The input signals for instructing IC1 and IC3 are generated by the expansion board 78 and input to chips IC1 and IC3 by data buss 85.

As shown, the multiplexing circuit also includes a second tier of eight MX1616 chips 88, each of which receives the dual outputs from eight of the MX1616 chips 86 in tier. 1. Like the MX1616 chips 86 in tier 1, the three bit channel address for the chips in tier 2 is also generated by IC1. Each chip 88 in tier 2 is also provided with an inhibit signal for sequentially enabling/disabling the tier 2 chips 88 which, as noted above, is necessary whenever several chips are used together for increasing channel capacity. The inhibit lines for the tier 2 chips are connected together and driven by IC2.

The outputs from each tier 2 chip 88 are applied, via the connector 68, to the inputs of the HDAS- chip 80 on the expansion board 78.

In the microcomputer 56, the load cell 36 and color sensor 48 output signals from each assembly 22 are compared with known values stored in the computer memory to determine the weight of the bottle 14 on each assembly and the color of the patch 54 on that bottle. As explained above, from this information, the computer can determine the exact bottle on each assembly 22, as well as the liquid volume content therein, and then generate displays or reports of inventory, expected cash receipts, etc., all as more fully described above. As programming of the microcomputer 56 to output the desired information based on the output signals from the load cells 36 and color sensors 48 is within the capabilities of the person of ordinary skill in the art who has read this description, a further description thereof is unnecessary.

Having now described the preferred embodiment of a system 10 in accordance with the invention, it will be apparent that various changes and additions may be made therein. One such addition is described below.

Sometimes, a bartender may place a bottle 14 somewhere on the bar other than on an assembly 22. This is especially significant at the end of a shift, when an inventory is taken for the purpose of determining expected cash receipts Also, a patron may bring his own bottle into the bar thereby depriving the proprietor of cash receipts. To address these possibilities, the system 10 may be enhanced by distributing a plurality of weight sensing pads about the bar area. These weight sensors would essentially operate in an on/off mode indicating whether or not a weight, which may be a predetermined minimum weight, has been placed thereon. The status of these pads can then be monitored by the microcomputer 56, which may be programmed to provide an audible and/or visual alarm whenever a pad is activated. The proprietor or other management personnel could then step into the bar and resolve the situation. As it is a simple matter for the microcomputer 56 to identify the precise pad or pads activating the alarm, the proprietor, even before stepping into the bar area, will know the precise areas where the misplaced bottles are located. This is especially significant in a large bar. Furthermore, the microcomputer 56 may be programmed to count the total number of bottles 14 in the bar area by counting the number of bottles 14 as detected by the weight sensing pads. Then, if the total number of bottles 14 exceeds the expected number of bottles, e.g., if the number of bottles 14 exceeds the number of assemblies 22 at the bar, the microcomputer 56 may be programmed to provide an audible and/or visual alarm to alert the proprietor that a patron may have brought his own bottle into the bar area.

Figure 7:
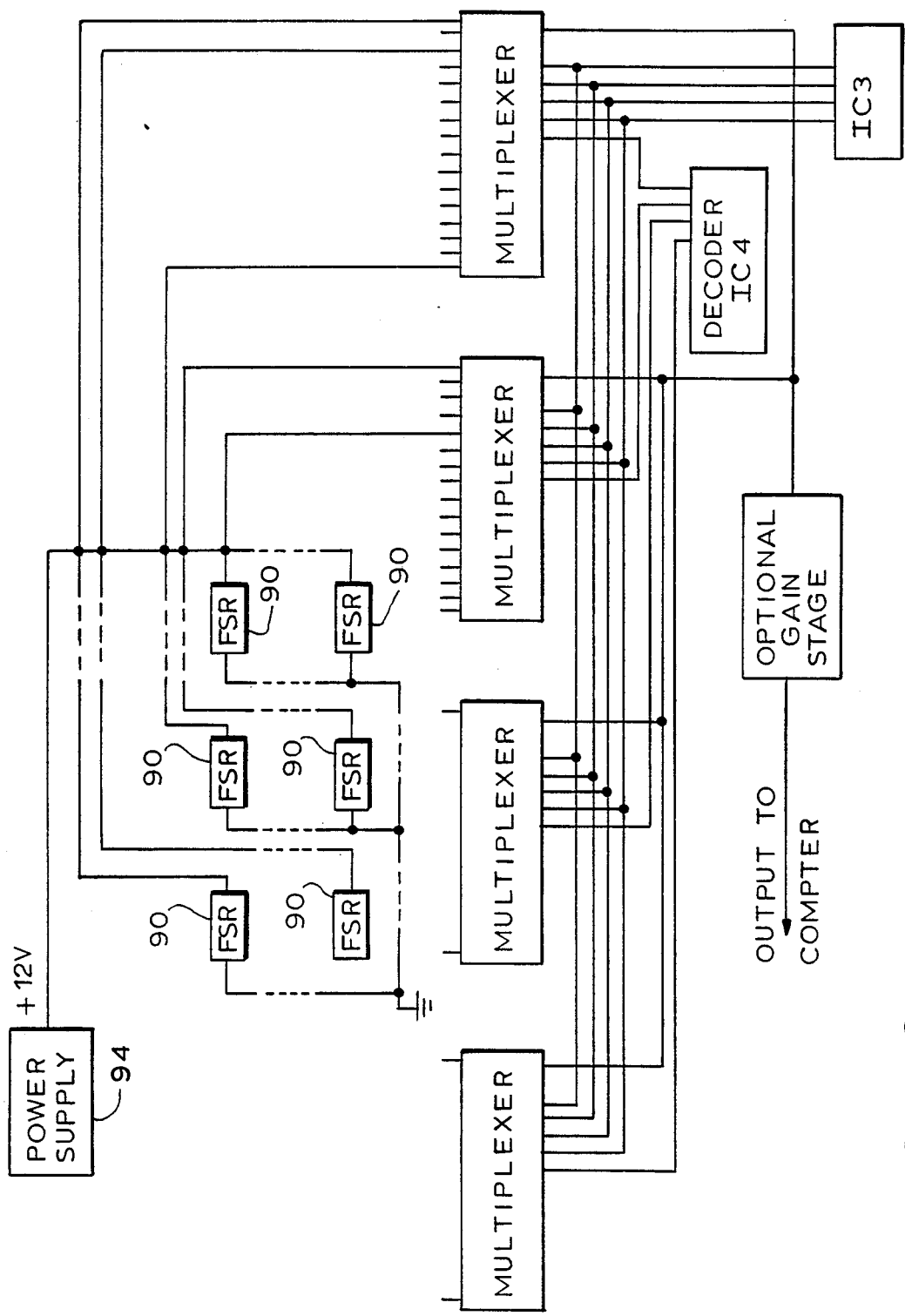
FIG. 7 is a schematic representation of the optional system for locating errant bottles.
Figure 8:
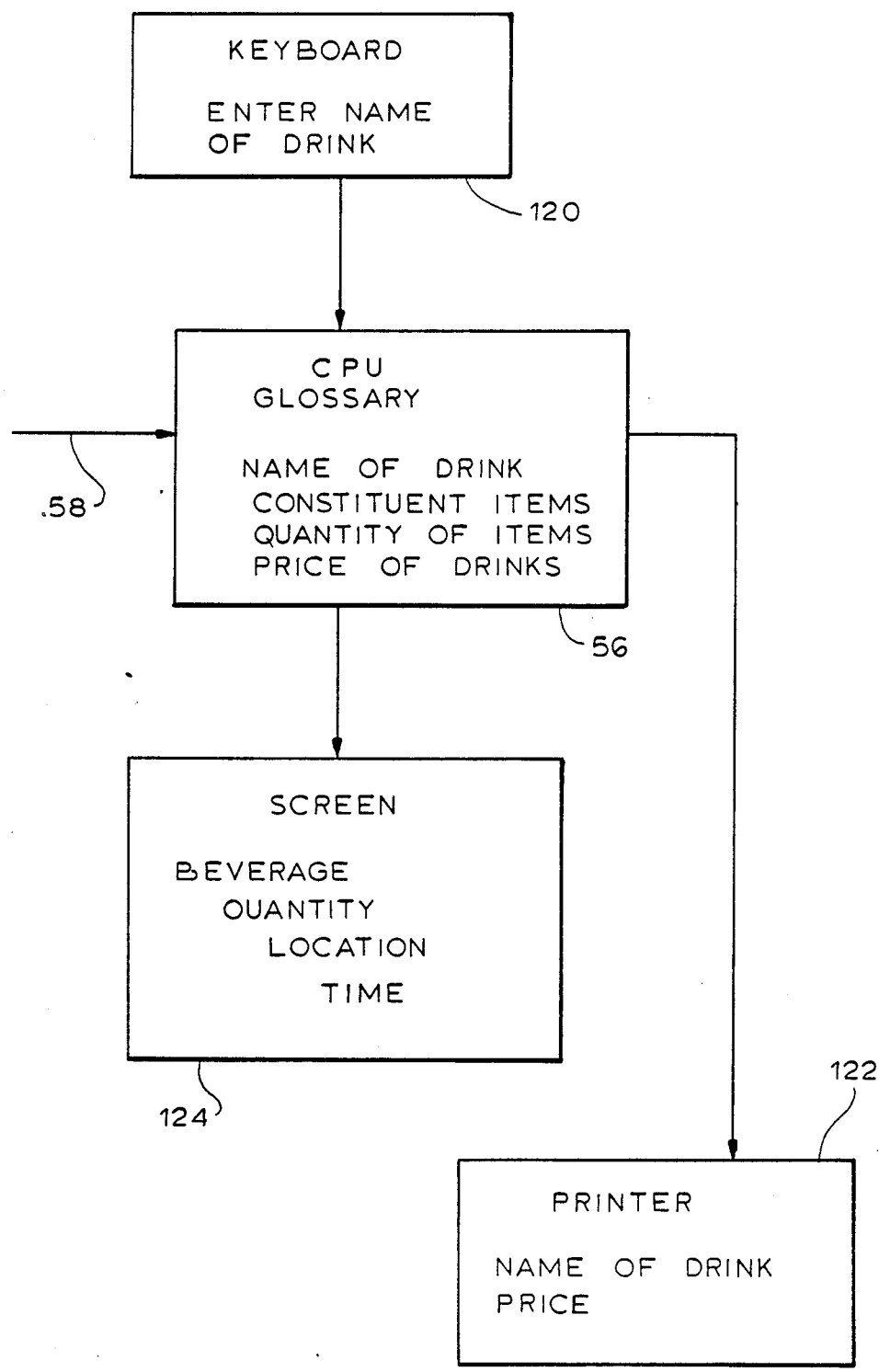
FIG. 8 is a flow of the apparatus constituting a terminal/register and its interrelationship with the bar of FIG. 1.

A suitable circuit for implementing this enhancement to the system 10 is shown in FIG. 7. In FIG. 7, each weight sensing pad is designated by the reference numeral 90 and, as noted above, these pads may be distributed throughout the area of the bar 12, e.g. both in the spaces between enclosures 22 and/or on the bar serving surface. In the circuit of FIG. 7, 64 pads are utilized, though those skilled in the art who have read this description will recognize that the number of pads may be decreased or increased as desired.

Each weight sensing pad 90 may comprise a force sensitive resistor, such as that manufactured by Interlock Electronics Inc. of Santa Barbara, Calif., which provides a voltage output in response to a predetermined weight being placed thereon. In the present invention, each force sensitive resistor 90 may be selected to provide an output voltage in response to a weight of 10 grams or more, which will be adjusted to a minimum weight such that objects other than bottles 14 commonly found in the vicinity of a bar will not be detected by the pads 90 and therefore mistaken as bottles (such other objects including, for example, glasses and ashtrays).

As shown, the voltage supply for the circuit of FIG. 7 is a non-reversing DC power supply 94, which may be an output available from the microcomputer 56. Each of the weight sensing pads 90 is sequentially addressed by MX1616 multiplexing chips 92. As each multiplexing chip 92 has sixteen input channels, four chips are required to handle the sixty-four weight sensing pads 90 in the embodiment shown in FIG. 7. In this regard, for purposes of clarity, only representative weight sensing pads 90 and their connections are shown in FIG. 7.

To sequentially address each of the sixteen inputs to each multiplexing chip 92, a four bit binary code is required, and this four bit binary code may be provided by the IC3 of FIG. 6. In this regard, except for the weight sensing pads 90 themselves, which, as noted, are distributed throughout the bar area, all of the circuit components illustrated in FIG. 7 are preferably included within the circuit enclosure 60, which also houses many of the circuit components illustrated in FIG. 6

As also described above in connection with FIG. 6., whenever several multiplexing chips 92 are used together, it is necessary to provide an inhibit signal to each chip, such that only one chip is enabled at any given time. As shown in FIG. 7, the inhibit signals for the multiplexing chips of FIG. 6 are generated by IC4, which may be a 74LS 153 dual four line to one line decoder chip as manufactured by several companies, functioning as a one of four decoders. As shown, the two bit channel address for IC4 is provided by two of the outputs from IC3 (FIG. 6).

The outputs from the MX1616 multiplexing chips 92 are input to the central processing unit of the microcomputer 56 which is preprogrammed to analyze those inputs and provide the information noted above, i.e., an identification of weight sensing pads 90 having a bottle thereon, the location of pads having bottles thereon, the total number of bottles in the bar area, etc. As the details of such programming are well within the capabilities of the person of ordinary skill in the art who has read this description, a further description thereof is unnecessary.

Alternatively, the outputs from the MS1616 multiplying chips 92 can be input to a gain stage or amplifier. The amplified signal can be further processed by the microprocessor 56 to also determine the weight on the activated weight sensing pad 90.

While the inventory control system for the present invention has been described hereinabove in the context of a bar, clearly the system of the present invention may also be utilized anywhere that an inventory must be kept of a plurality of containers having liquid or non-liquid contents. Further, such system can be utilized in conjunction with non containers such as solid foodstuffs having a surface portion upon which a unique element (such as the color patch) may be disposed. Thus, for example, one may keep track of the changes in weight of any foodstuffs in a storage area such as a storeroom or refrigerator simply by identifying each foodstuff or its container with a unique element and dividing the storage area in which the foodstuffs are to be stored into discrete assemblies (e.g., enclosures) of the same or differing sizes, according to the present invention. Thus, there may be can-sized assemblies for receiving a variety of different liquid or solid-containing cans (e.g., cans of caviar, soup, morille mushrooms or the like) and other sized assemblies for receiving various solid foodstuffs without containers (e.g., of beef, cheeses, and the like).

Once the microprocessor portion of the microcomputer 56 receives the output signals from a given enclosure, it will be able to determine whether the article in the enclosure is a container. If it is a container, the microprocessor will have stored in its memory the weight of the container, which can then be subtracted from the indicated weight to obtain the weight of the remaining contents of the container The microprocessor 56 will also have stored in memory whether the contents of the particular container are liquid or solid and, if liquid, will also have stored in memory the density of the liquid so that it can convert the indicated remaining weight of the liquid into volumetric data. To summarize, the inventory control system of the present invention is useful in connection both with liquids and solids, regardless of whether or not the latter are in containers. Again, while the present invention has been described in the context of comestible articles, clearly it is equally useful with non-comestible articles such as, for example, automotive parts, television sets or any other article capable of exhibiting a unique element such as the color sensor.

While the apparatus of the present invention may be used to provide inventory only at the beginning and end of each shift, it is equally capable of monitoring or scanning the output signals from the transducer and sensor of each assembly on an effectively continuous basis. An effectively continuous basis may range from several times a second to several times a minute, depending upon the time required to remove and replace the articles involved Thus, bottles in a bar need to be inventoried once a second or so, while an automobile need be inventoried only once a minute as it is unlikely that a bottle can be removed and replaced in an assembly (or returned to another assembly) within one second or that a car can be similarly removed from one designated area (corresponding to an assembly) and replaced within a minute Such effectively continuous monitoring of the output signals permits the system to determine the change in weight or volume not simply on a per shift basis, but on a per removal basis. Thus, when the system of the present invention is used in the context of a bar, it is possible to determine how much of the liquor in a bottle was dispensed each time it was removed from the assembly and before it was placed in the same or another assembly. Assuming that only one pour of liquor is made during each cycle of removal and return, this data enables one to determine whether the bartender is underpouring or overpouring on each pour. Of course, inasmuch as the drink being prepared may be a double or a plurality of drinks may be prepared during a given removal/return cycle, and inasmuch as different drinks may require different sized pours, such data must be interpreted with a degree of sensitivity and caution.

On the other hand, the inventory control system of the present invention facilitates the detection of any watering of liquor in a bottle because any increase in the liquid contents of a bottle can immediately be flagged for attention by the microcomputer as a possible instance of watering of the liquor. Similarly, the system can determine whether a bottle underwent a removal/return cycle without a change in the volume of the liquid contents, thus suggesting that at some point during the cycle the bartender poured a drink and replaced it with a diluent, again watering the liquor remaining in the bottle. Such data must be interpreted cautiously, however, as occasions may arise where a bottle is unintentionally selected and must be replaced without having been used.

Finally, the system can signal flag the presence on an assembly of any bottle which does not have thereon the unique indicia (such as the color patch). Such a bottle would be unauthorized and was perhaps brought in surreptitiously by the bartender.

Instead of a color patch, the apparatus of the present invention can utilize an active identification system, such as an electronic tag placed on each container. The electronic tag could be, for example, a radio frequency identification device ("RFID") with a relatively short read range. Such RFID can utilize either low or high frequency radio waves and in particular, can utilize low frequency waves having shorter range but higher identification accuracy A typical RFID is available from Namco Controls of Mentor, Ohio under its trademark SENSORNET. An advantage of an RFID system is that the signal emitted from the label can be selected to travel only a relatively short distance so that each assembly only reads the signal emitted from the label mounted to the surface of the article placed on the supporting surface of that assembly. The RFID tag or label takes the place of, for example, the uniquely colored patch mounted on the undersurface of the bottle container and a receiver takes the place of the color sensor and associated circuitry.

The bar inventory control system described hereinabove may be employed as part of a full bar control system which reminds the bartender to enter all drinks which he has poured and prints out a check (including the name of the drink and the price thereof), as well as keeping track of the components of those drinks for which the bartender has not yet charged, so that he must account for or be held accountable for such drinks at the end of his shift. Referring now to FIG. 1, in the full bar control system there is additionally disposed at the bar 12 a register/terminal generally designated 118 and including entry means such as a keyboard 120, printer means such as a slip or check printer 122, display means such as a CRT, LED, LCD, or other suitable display screen 124, and a cash drawer such as a conventional cash register 126. The first three of these components 120, 133, 124 are extensions of the back room computer or microprocessor 56, for example, via an RS232 Serial Link, while the fourth (i.e., the cash drawer) is free-standing. The registered terminal 118 including these four components is sued for the log-on and log-off of employees as well as for a continuous activity report which provides the reminders.

During log-on of an employee, the employee identifies himself by name and password and indicates the amount of cash in the cash drawer at the beginning of his shaft. During log-off of the employee, similar information may be provided and the system will compute and record such pertinent information as the total time worked by the employee, the earned income (that is, the increase in the amount in the cash drawer relative to the amount indicated during log-on), the deviation between the earned income and what should have been the earned income according to the drink sales actually recorded by the bartender (this being called the "actual deviation"), and the deviation between the earned income and what should have been the earned income according to the amount of liquor poured, as determined by the bar inventory control system described hereinabove (this being called the "relative deviation").

Deviations may reflect innocent errors such as providing the wrong change to customers, culpable activities such as the bartender pocketing payments for drinks or not entering sales into the system, or even such appropriate activities as providing complimentary drinks to special customers. The actual deviation should be zero if the bartender is properly using the cash drawer, making change properly, and the like; the bartender is usually held responsible for any discrepancies. The relative deviation is a statistical tool only. The calculation of the price of the amount of liquor poured and not otherwise accounted for is based upon an estimated price for a unit quantity of liquor (maintained in the storage means or memory of microprocessor 56), although in fact the same quantity of liquor may be sold at one price as a straight shot, at another price when mixed with soda water (which soda water is probably not monitored by the system in view of its relative inexpensiveness and its typical dispensing from a spigot or faucet rather than from a bottle), and at a third price as part of a mixed drink (for which the price of the mixed drink reflects not only the cost of the constituent liquors or liquors and juices, but also the time and labor of the bartender required to prepare the mixed drink). Nonetheless, the relative deviation provides management some dollar and cents figure with which to confront a bartender who has been overpouring or not accounting to the house for drinks sold. Relative deviations may reflect a net underpouring or overpouring by the bartender, failures by the bartender to enter drinks poured, or the like.

The interpretation of the deviations will depend to some extent upon the ground rules set by management and the implementing software. For example, if the bartender is instructed not to enter complimentary drinks into the system, then the complimentary drinks will be reflected in both the actual and relative deviations. Preferably, the bartender will be instructed to enter complimentary drinks into the system and merely collect the checks printed therefor for later inspection by management. If the complimentary drink bills are considered part of earned income (that is, as the equivalent of cash in the cash drawer), neither deviation figure will reflect the complimentary drinks.

Between log-on and log-off the screen provides a continuous activity report providing information of the type available from the system described hereinabove, including the following:

(a) Name. This may be a generic name for the type of beverage dispensed and/or a particular brand name.

(b) Quantity. This may be provided in any convenient units appropriate to the beverage as, as noted above, the system can easily convert from weights to volumes using the stored density information associated with each liquor. If preferred, the quantity may be displayed as a cost using the same unit costs stored in memory for use during log-off.

(C) Location. The identification of the location of the bottle on the bar 12 from which the beverage was poured (that is, the assembly 22 to which the bottle was returned) is not essential, but is recommended as it may help to refresh the bartender's mind, especially where the bar contains the same beverage at different locations (that is, bottles of the same liquor at different assemblies 22).

(D) Time. While time, like location, is not an essential item of the activity report, an indication of the precise time at which a bottle was returned to its assembly 22 may prove of assistance to the bartender in reminding him of the particular transaction.

The activity report scrolls upwards to accommodate further activity, but is optionally capable of being scrolled downwardly temporarily by the bartender or review purposes.

The activity report would also contain an indication of whether or not all beverages dispensed had been accounted for, as described hereinbelow. If so, the employee could initiate the log-off procedure by entering his name and password and the amount of cash in the cash drawer. If not, either the missing beverages must be accounted for by their entry into the system as drinks sold or the manager's approval obtained before log-off is initiated.

The entry means enables entering into the system data representing each drink sold. The drink sold is identified by the name of the drink, utilizing a brand name where appropriate —for example, because the charge for the brand name is greater than for the generic or another brand name. Entry may be by a conventional keyboard, where specific keys identify specific drinks or where a code or abbreviation is used to specify the particular drink. If more than one serving of a particular drink is ordered, the number of servings of that drink may also be entered. Clearly, a variety of different data entry means may be utilized. Known data entry means include keyboards, voice-actuated transducers, and touch-responsive screens (wherein a menu of different drinks and quantities are present on a pressure-sensitive screen so that it is only necessary for the bartender to touch the screen at the appropriate places to cause entry of the corresponding data).

Optionally, a particular drink may be identified as complimentary so that the bill eventually produced as described hereinafter is correspondingly marked complimentary or, if management prefers, no bill at all is printed for that drink at that time. In the latter instance, the log-off procedure would result in the printing of a list of all complimentary drinks dispensed during a given shift so that the management can check that the number was reasonable or within the predetermined limit set by management for a given shift. As a further optional feature, the entry means may enable an association of particular items sold with a customer so that a running tab may be kept during a given shift for particular customers. However, the check for a running tab would not be printed until an appropriate entry on the entry means requested the printing of the check for the running tab or a log-off was initiated.

The microprocessor 56 will include in its storage means or memory a table associating with each drink for sale (a) whatever name, abbreviation, or code may be used therefor by the bartender on the entry means, (b) its actual name, (c) the price thereof, (d) the inventory item component or components thereof (for example, the various liquors and mixers used in a mixed drink), and (e) the quantity of each inventory item component in the drink. Once data representing a drink sold is entered by the bartender on the entry means, the microprocessor 56 will locate in the storage means table, for that drink sold, its name and the price thereof and cause the printer to print a statement in the nature of a bill. Generally, the statement would be printed immediately upon entry of the data on the entry means, but optionally the statement would be delayed until a later time when the entered data indicated that a running tab was to be maintained or that the drink was complimentary. The statement would identify the drink sold (according to the information entered in the entry means) by the name and price thereof associated in the storage means with the drink designated as sold. The microprocessor may also compute the appropriate sales tax and provide a total.

Once the data representing a drink sold is entered by the bartender on the entry means, the microprocessor 56 will also locate in the storage means table for that drink sold the inventory item component or components thereof and the quantity of each inventory item component in the drink, and decrement the quantity of the corresponding inventory item component from the activity report on the screen appropriately. If the inventory item component is reduced to zero, then the inventory item component is simply removed from the activity report on the screen. It will be appreciated that the screen is preferably decremented for the inventory item components for drinks sold even though the drinks are identified as being on a running tab (so that the actual statement is not printed by the print means until a subsequent time) or being complimentary drinks (so that either no statement is printed therefor or a statement is printed with an indication that it is for a complimentary drink). This arrangement is preferred so that the items of the activity report on the screen reflect only the components of those drinks for which the bartender has not yet entered data on the entry means. Thus the screen serves as a reminder for the bartender. If desired, however, the inventory item components of complimentary drinks or drinks on a running tab may be maintained on the screen until a log-off, depending upon the preference of the management.

To more efficiently serve as a reminder, an item on the screen may be emphasized after it has remained on the screen for a predetermined period, for example, a minute or two. Emphasis may be placed on the particular item by flashing the item, underlining it, checking it or the like, so as to draw the bartender's attention to the fact that there is an unaccounted for drink. Hopefully, this reminder, in combination with the specification of the location and time of the transaction (i.e., the location to which the bottle was returned and the time of return) will provide assistance to the bartender in recalling the unrecorded transaction.

It will be apparent to those skilled in the art that all or some of the entry means, cash drawer, printer means, and display means may be integrated into a single register/terminal, similar to an automated cash register.

While we have herein shown and described a preferred embodiment of a system in accordance with the present invention, and have suggested certain modifications thereto, or ordinary skill in the art will recognize that still further changes and modifications may be made therein without departing from the spirit and scope of the invention. Accordingly, the above description should be construed as illustrative, and not in a limiting sense, the scope of the invention being defined by the following claims.

We claim:

1. Apparatus for automatically determining the weight of a plurality of articles, each of the articles having a surface portion with a unique element thereon, comprising:
    (A) a plurality of assemblies, each including (i) a surface for supporting an article, (ii) a transducer in operative contact with said supporting surface for producing an output signal indicative of the weight of an article placed on said supporting surface, and (iii) a sensor in operative relationship with an article on said supporting surface for producing an output signal indicative of the unique element on the surface portion of the article; and
    (B) means for receiving said transducer output signals and said sensor output signals and, for each article on said supporting surfaces, for computing the weight of the article based on said transducer output signal and for identifying the article based on said sensor output signal.

2. The apparatus of claim 1 wherein the articles are containers having liquid contents, and said receiving and computing means has stored therein data on the density of the liquid contents and the weight of the empty container and computes the volume of the liquid contents.

3. The apparatus of claim 1 wherein said receiving and computing means essentially continuously receives said output signals and, for any appreciable change in the weight of an article, computes the change.

4. An apparatus for automatically determining the volume contents of a plurality of containers, each of the containers having a surface portion with a unique element thereon, comprising:
    (A) a plurality of assemblies, each comprising (i) a surface for supporting a container, (ii) a transducer in operative contact with said supporting surface for producing an output signal indicative of the weight of a container placed on said supporting surface, and (iii) a sensor in operative iu relationship with a container on said supporting surface for producing an output signal indicative of the unique element on the surface portion of the container; and
    (B) means for receiving said transducer output signals and said sensor output signals and, for each container 5 on said supporting surface, for computing the volume of the contents of each container based on said transducer output signal, and for identifying the container based on said sensor output signal.

5. The apparatus of claim 4 wherein the containers have liquid contents, and said receiving and computing means has stored therein data on the density of the liquid contents and the weight of the empty container and computes the volume of the liquid contents.

6. The apparatus of claim 4 wherein said receiving and computing means essentially continuously receives said output signals and, for any appreciable change in the weight of an article, computes the change.

7. The apparatus of claim 4, wherein said sensor comprises a light sensor, said unique element comprises a light reflector, and said output signal from sensor is an electrical signal indicative of the light reflected by said unique element.

8. The apparatus of claim 4, further comprising a plurality of weight sensing means in the vicinity of said plurality of assemblies, each weight sensing means comprising a transducer for producing an output signal indicative of the weight of an article placed thereon, and means for receiving said output signals from said weight sensing pads for determining whether or not an article has been placed thereon 9. The apparatus of claim 8 further comprising computing means for determining which weight sensing means in said plurality of weight sensing means is producing an output signal indicating that an article is placed thereon.

10. Apparatus for monitoring the sale of articles including inventory item components and detecting discrepancies between the article identified as sold and the inventory item components actually depleted from inventory, comprising:

(A) storage means associating with each article for sale, its name, the price thereof, the inventory item component or components thereof, and the quantity of each inventory item component in the article;

(B) entry means for entering data representing each article sold;

(C) print means for printing a statement including indicia identifying the article sold as entered in each entry means by its name and the price thereof as associated in said storage means with the article sold;

(D) display means for displaying data representing inventory item components and the quantities thereof actually depleted from inventory; and (E) decrementing means for decrementing from the data represented on said display means the inventory item components and quantities thereof associated in said storage means with the articles represented by the article sold data entered on said entry means.

11. The apparatus of claim 10 wherein said articles are beverages.

12. The apparatus of claim 10 wherein said entry means is a keyboard.

13. The apparatus of claim 10 additionally including means for signalling when the data displayed on said display means remains over a predetermined period of time.

14. The apparatus of claim 10 wherein said entry means includes means for entering data representing the names of the articles sold and the number thereof.

15. The apparatus of claim 10 wherein said display means additionally displays the locations from which and the times at which the inventory item components were taken.

16. Apparatus for monitoring the sale of articles including inventory item components and detecting discrepancies between the articles identified as sold and the inventory item components actually depleted from inventory, comprising:

(A) storage means associating with each article for sale, its name, the price thereof, the inventory item component or components thereof, and the quantity of each inventory item component in the article;

(B) entry mans for entering data representing each article sold by the name and number of the article;

(C) print means for printing a statement including indicia identifying the article sold as entered in said entry means by its name and the price thereof as associated in said storage means with the article sold;

(D) display means for displaying data representing inventory item components, and the quantities thereof actually depleted from inventory, the locations from which they were taken, and the times at which they were taken;

(E) decrementing means for decrementing from the data represented on said display means the inventory item components and quantities thereof associated in said storage means with the articles represented by the article sold data entered on said entry means; and (F) means for signalling when the data displayed on said display means remains over a predetermined period of time.

17. The apparatus of claim 14 including means for automatically determining the weight of a plurality of inventory item components, each of the inventory item components having a surface portion with a unique element thereon, said weight determining means comprising:

(A) a plurality of assemblies, each including (i) a surface for supporting an inventory item component, (ii) a transducer in operative contact with said supporting surface for producing an output signal indicative of the weight of an inventory item component placed on said supporting surface, and (iii) a sensor in operative relationship with an inventory item component on said supporting surface for producing an output signal indicative of the unique element on the surface portion of the inventory item component; and (B) means for receiving said transducer output signals and said sensor output signals and, for each inventory item component on said supporting surfaces, for computing the weight of the inventory item component based on said transducer output signal and for identifying the inventory item component based on said sensor output signal.

18. The apparatus of claim 17 additionally including means for essentially continuously receiving said output signals and, for any appreciable change in the weight of an inventory item component, computing the quantity actually depleted from inventory and communicating to said display means data representing the inventory item component and the quantity thereof actually depleted rom inventory.

19. An apparatus for automatically determining the volume contents of a plurality of containers, each of the containers having a surface portion with a unique light reflecting colored patch thereon, comprising:

(A) a plurality of assemblies, each comprising (i) a surface for supporting a container, (ii) a transducer in operative contact with said supporting surface for producing an output signal indicative of the weight of a container placed on said supporting surface, and (iii) a color sensor in operative relationship with a container on said supporting surface for producing an output signal indicative of the light reflected by the colored patch on the surface portion of the container; and (B) means for receiving said transducer output signals and said sensor output signals and, for each container on said supporting surface, for computing the volume of the signal, and for identifying the container based on said sensor output signal.

20. An apparatus for automatically determining the volume contents of a plurality of containers, each of the containers having a surface portion with a unique light reflector thereon, comprising:

(A) a plurality of assemblies, each defining a volume and comprising (i) a surface for supporting a container, (ii) a transducer in operative contact with said supporting surface for producing an output signal indicative of the weight of a container placed on said supporting surface, and (iii) a light sensor disposed within said volume in operative relationship with a container on said supporting surface for producing an output signal indicative of the light reflected by the light reflector on the surface portion of the container;

(B) means for receiving said transducer output signals and said sensor output signals and, for each container on said supporting surface, for computing the volume of the signal, and for identifying the container based on said sensor output signal; and (C) a light source disposed in said volume, a first transparent section in said supporting surface for accommodating light transmission from said source to said light reflector, and a second transparent section in said supporting surface for accommodating light transmission from said light reflector to said sensor.

21. The apparatus of claim 20, wherein said light reflector is a colored patch and said light sensor is a color sensor.

22. An apparatus for automatically determining the volume contents of a plurality of containers, each of the containers having a surface portion with a unique element thereon, comprising:

(A) a plurality of assemblies, each comprising (i) a surface for supporting a container, (ii) a transducer in operative contact with said supporting surface for producing an output signal indicative of the weight of a container placed on said supporting surface, and (iii) a sensor in operative relationship with a container on said supporting surface for producing an output signal indicative of the unique element on the surface portion of the container;

(B) means for receiving said transducer output signals and said sensor output signals and, for each container on said supporting surface, for computing the volume of the contents of each container based on said transducer output signal, and for identifying the container based on said sensor output signal; and (C) a multiplexing circuit for sequentially scanning the output signals from each enclosure and transmitting the same to said receiving and computing means.

23. Apparatus for automatically determining the weight of a plurality of articles, each of the articles having a surface portion with a unique light reflecting colored patch thereon, comprising:

(A) a plurality of assemblies, each including (i) a surface for supporting an article, (ii) a transducer in operative contact with said supporting surface for producing an output signal indicative of the weight of an article placed on said supporting surface, and (iii) a color sensor in operative relationship with an article on said supporting surface for producing an output signal indicative of the light reflected by the colored patch on the surface portion of the article; and (B) means for receiving said transducer output signals and said sensor output signals and, for each article on said supporting surface, for computing the weight of the article based on said transducer output signal and for identifying the article based on said sensor output signal.

24. Apparatus for automatically determining the weight of a plurality of articles, each of the articles having a surface portion with a unique light reflector, comprising:

(A) a plurality of assemblies, each defining a volume and including (i) a surface for supporting an article, (ii) a transducer in operative contact with said supporting surface for producing an output signal indicative of the weight of an article placed on said supporting surface, and (iii) a light sensor disposed within said volume in operative relationship with an article on said supporting surface for producing an output signal indicative of the light reflected by the light reflector on the surface portion of the article;

(B) means for receiving said transducer output signals and said sensor output signals and, for each article on said supporting surfaces, for computing the weight of the article based on said transducer output signal and for identifying the article based on said sensor output signal; and (C) a light source disposed in said volume, a first transparent section in said supporting surface for accommodating light transmission from said source to said light reflector, and a second transparent section in said supporting surface for accommodating light transmission from said light reflector to said sensor.

25. The apparatus of claim 21, wherein said light reflector is a colored patch and said light sensor is a color sensor.

26. Apparatus for automatically determining the weight of a plurality of articles, each of the articles having a surface potion with a unique element thereon, comprising:

(A) a plurality of assemblies, each including (i) a surface for supporting an article, (ii) a transducer in operative contact with said supporting surface for producing an output signal indicative of the weight of an article placed on relationship with an article on said supporting surface for producing an output signal indicative of the unique element on the surface portion of the article;

(B) means for receiving said transducer output signals and said sensor output signals and, for each article on said supporting surfaces, for computing the weight of the article based on said transducer output signal and for identifying the article based on said sensor output signal; and (C) a multiplexing circuit for sequentially scanning the output signals from each enclosure and transmitting the same to said receiving and computing means.

* * * * *

UNITED STATES PATENT AND TRADEMARK OFFICE
CERTIFICATE OF CORRECTION

PATENT NO. : 4,961,533
DATED : October 9, 1990
INVENTOR(S) : David M. Teller, et al.

It is certified that error appears in the above-identified patent and that said Letters Patent is hereby corrected as shown below:

Column 20 (Claim 4), line 64, delete "5".

Column 22 (Claim 17), line 33, delete "14" and add -- 10 --.

Column 24 (Claim 26), line 55, after "placed on" add

-- said supporting surface, and (iii) a sensor in operative --.

Signed and Sealed this

Twenty-sixth Day of April, 1994

BRUCE LEHMAN

*Attest:*

*Attesting Officer*    Commissioner of Patents and Trademarks